(12) United States Patent
Englander et al.

(10) Patent No.: US 11,077,796 B1
(45) Date of Patent: Aug. 3, 2021

(54) MIRROR ASSEMBLY WITH EXTENDED MOUNT AND SUPER DUTY MIRROR SYSTEM/DOOR DELETE OPTION AND SUPPORT PLATE WITH SLOTS

(71) Applicant: ROSCO, INC., Jamaica, NY (US)

(72) Inventors: Benjamin Englander, Woodmere, NY (US); Julian Serer, Plainview, NY (US); Joe Ippolito, West Windsor, NJ (US); Arti Karkar, New York, NY (US)

(73) Assignee: ROSCO, INC., Jamaica, NY (US)

( * ) Notice: Subject to any disclaimer, the term of this patent is extended or adjusted under 35 U.S.C. 154(b) by 173 days.

(21) Appl. No.: 16/012,625

(22) Filed: Jun. 19, 2018

Related U.S. Application Data

(63) Continuation-in-part of application No. 15/088,623, filed on Apr. 1, 2016, now Pat. No. 10,821,898.

(60) Provisional application No. 62/524,367, filed on Jun. 23, 2017, provisional application No. 62/141,913, filed on Apr. 2, 2015.

(51) Int. Cl.
*B60R 1/06* (2006.01)
*B62D 65/16* (2006.01)

(52) U.S. Cl.
CPC ............... *B60R 1/06* (2013.01); *B62D 65/16* (2013.01)

(58) Field of Classification Search
CPC ................................ B60R 1/06; B60R 1/0617
USPC .................................. 359/850, 872; 248/479
See application file for complete search history.

(56) References Cited

U.S. PATENT DOCUMENTS

| | | | | |
|---|---|---|---|---|
| 1,110,973 | A | * | 9/1914 | Tischler .................. B60R 1/078 248/486 |
| 1,810,435 | A | * | 6/1931 | Paulson .................... B60R 1/06 248/487 |
| 1,973,847 | A | * | 9/1934 | De Orlow ................. B60R 1/06 248/482 |
| 2,143,281 | A | * | 1/1939 | Sauer ....................... B60R 1/06 248/480 |
| 2,176,723 | A | * | 10/1939 | Sauer ....................... B60R 1/06 248/480 |
| 2,447,786 | A | * | 8/1948 | Anderson, Jr. ............... 248/476 |
| 2,458,117 | A | * | 1/1949 | Tolbert ....................... 248/279.1 |

(Continued)

*Primary Examiner* — Ricky D Shafer
(74) *Attorney, Agent, or Firm* — Manatt, Phelps & Phillips, LLC

(57) ABSTRACT

An extended mirror mounting assembly for mounting one or more mirrors to a vehicle is provided. The mirror mounting assembly has one or more mirror mounting arms, each including an arm portion and configured to support the mirrors. The mirror mounting assembly has a lower support member including a lower base end portion configured to be connected to the vehicle at a first vehicle location and a lower distal end portion configured to be connected to the mirror mounting arms at a first mount location. The mirror mounting assembly has an upper support member including an upper base end portion configured to be connected to the vehicle at a second location and an upper distal end portion configured to be connected to the mirror mounting arms at a second mount location. The mirror mounting assembly has a lateral support post or spacer including a lateral base end portion configured to be connected to the vehicle at a third vehicle location and a lateral distal end portion configured to be connected to the upper support member.

21 Claims, 19 Drawing Sheets

(56) References Cited

U.S. PATENT DOCUMENTS

| | | | | |
|---|---|---|---|---|
| 2,545,777 A | * | 3/1951 | Hardin | B60R 1/078 |
| | | | | 248/279.1 |
| 2,596,632 A | * | 5/1952 | Whitehead | B60R 1/078 |
| | | | | 248/279.1 |
| 2,616,648 A | * | 11/1952 | Budreck | B60R 1/06 |
| | | | | 248/487 |
| 7,267,384 B1 | * | 9/2007 | Coviello | B60R 1/078 |
| | | | | 296/1.11 |
| 10,821,898 B1 | * | 11/2020 | Englander | B60R 1/082 |
| 2002/0027186 A1 | * | 3/2002 | Lang | B60R 1/0605 |
| | | | | 248/475.1 |

* cited by examiner

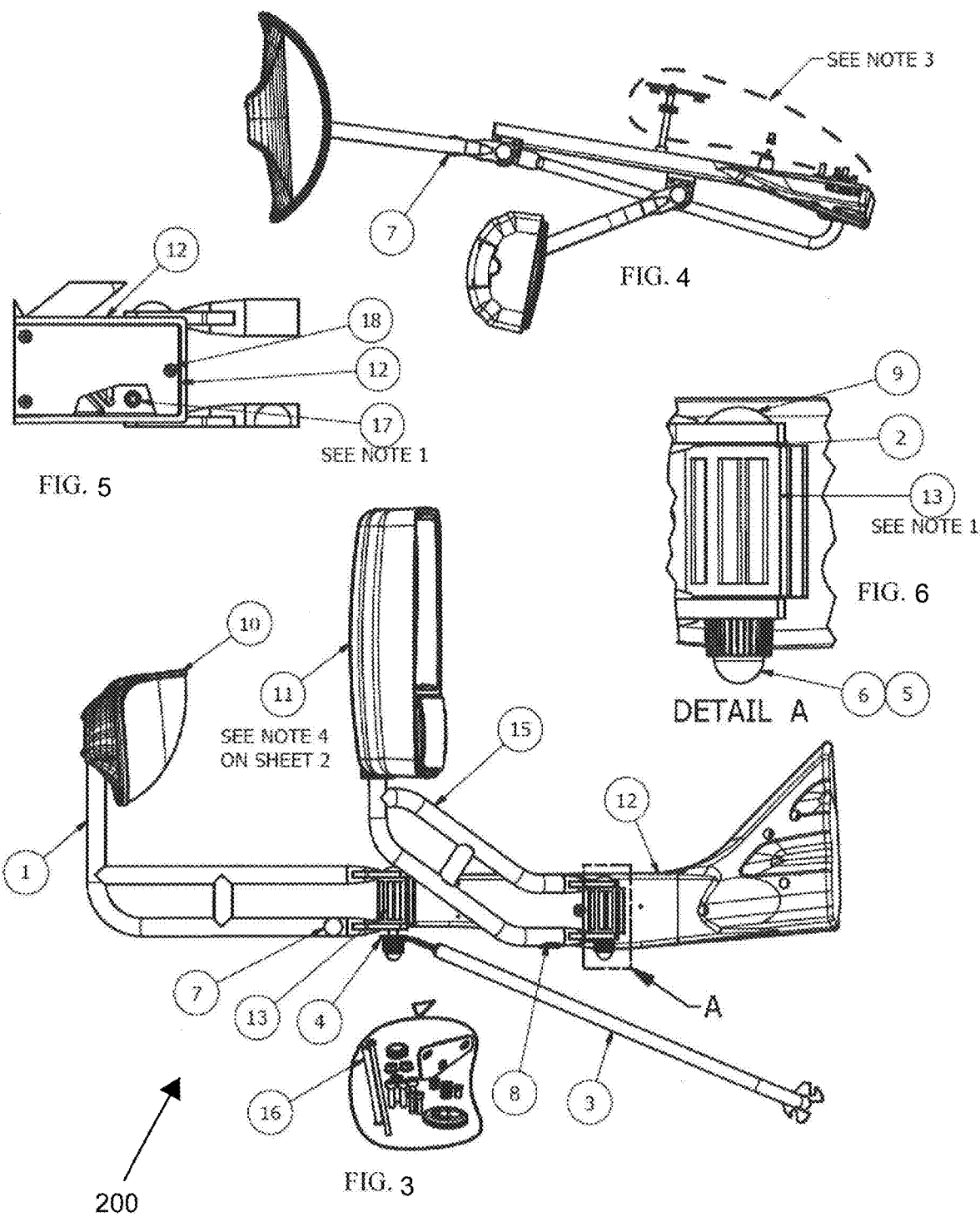

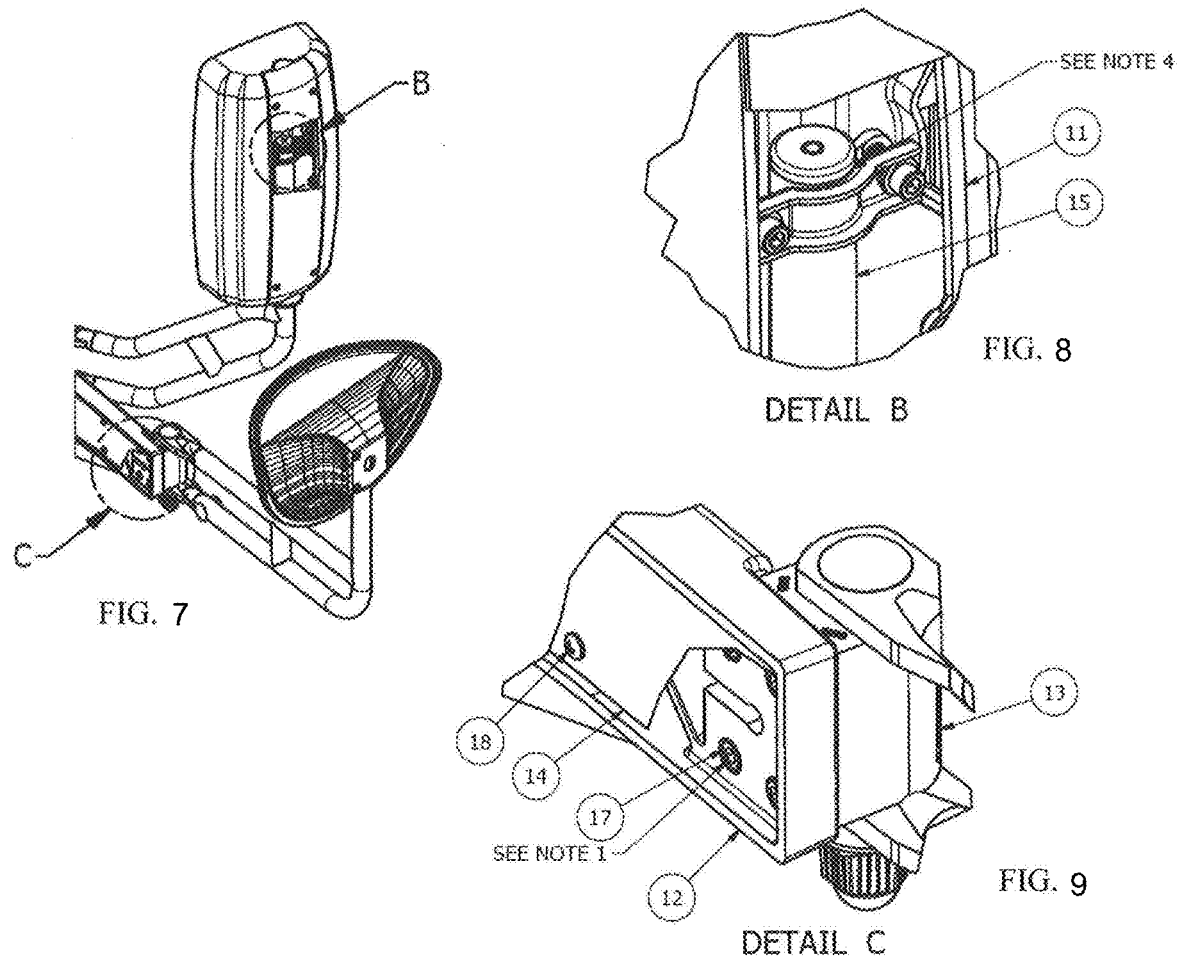

MIRROR ASSEMBLY WITH EXTENDED MOUNT AND SUPER DUTY MIRROR SYSTEM/DOOR DELETE OPTION AND SUPPORT PLATE WITH SLOTS

INCORPORATION BY REFERENCE TO RELATED APPLICATIONS

This application claims benefit of and priority to U.S. Provisional Patent Application No. 62/524,367, entitled "Mirror Assembly With Extended Mount," filed on Jun. 23, 2017. This application is also a continuation-in-part of U.S. application Ser. No. 15/088,623, entitled "Mirror Mount with Lateral Support Brace and Triangle Mirror Mount," filed Apr. 1, 2016, which claims priority to U.S. Provisional Application No. 62/141,913, entitled "Mirror Mounting Assembly Including Lateral Support Brace Assembly and Method of Installing Same," filed on Apr. 2, 2015. The above applications are hereby incorporated by reference in their entirety and are to be considered a part of this specification.

BACKGROUND

This disclosure generally relates to a mirror assembly for vehicles. More specifically, the present disclosure relates to a mirror assembly with extended mount and super duty mirror system/door delete option.

SUMMARY

Various embodiments for mirror mounting assemblies for supporting one or more mirrors are provided. In addition, various alternative methods of installing the mirror mounting assemblies are also provided.

In some embodiments, the present invention provides an extended mirror mounting assembly and/or a method of installing extended mirror mounting assembly having at least one lateral support brace assembly and/or other support brace assembly system.

In some embodiments, an extended mirror mounting assembly for mounting one or more mirrors to a vehicle comprises one or more mirror mounting arms, each including an arm portion and configured to support the mirrors, a lower support member including a lower base end portion configured to be connected to the vehicle at a first vehicle location and a lower distal end portion configured to be connected to the mirror mounting arm at a first mount location, an upper support member including an upper base end portion configured to be connected to the vehicle at a second location and an upper distal end portion configured to be connected to the mirror mounting arm at a second mount location, and a lateral support post or spacer including a lateral base end portion configured to be connected to the vehicle at a third vehicle location and a lateral distal end portion configured to be connected to the upper support member.

In some embodiments, a second lateral support post or spacer including a lateral base end portion is configured to be connected to the vehicle at a fourth vehicle location and a lateral distal end portion is configured to be connected to the upper support member. The lower distal end portion of the lower support member and the upper distal end portion of the upper support member are connected to the upper support member. In some embodiments, the upper support member is connected substantially perpendicular to at least a portion of the lower and/or upper support member. In some embodiments, the upper support member is in the form of a single-piece lateral mounting casting substantially configured in a triangular shape for connection to the frame or structural area of the vehicle.

In some embodiments, the extended mirror mounting assembly is configured to mount a rear view mirror. In other embodiments, the extended mirror mounting assembly is configured to mount a cross view mirror. In other embodiments, the extended mirror mounting assembly is configured to mount both a rear view mirror and a cross view mirror.

In some embodiments, the lateral support posts or spacers are positioned between the upper support member of the extended mirror mounting assembly and the vehicle to reduce vibration and/or provide further stability to the extended mirror mounting assembly especially, for example, when the vehicle is moving. In some embodiments, one end of the one or more posts or spacers is attached to the upper support member while the other end of the one or more posts or spacers is attached to the vehicle.

In some embodiments, a similar mirror mounting assembly is mounted on the passenger side of the vehicle based on viewing objectives and/or requirements, i.e., the driver side rear view mirror is viewed through the door and the passenger side rear view mirror is viewed through the windshield by the driver.

Additional, alternative and/or optional features and advantages are described further below. This summary section is meant merely to illustrate certain features of the invention, and is not meant to limit the scope of the invention in any way. The failure to discuss a specific feature or embodiment of the invention, or the inclusion of one or more features in this summary section, should not be construed to limit the invention as claimed.

BRIEF DESCRIPTION OF THE DRAWINGS

The foregoing summary, as well as the following detailed description of preferred embodiments of the assembly, will be better understood when read in conjunction with the appended drawings. For the purposes of illustrating certain aspects of the present invention, there are shown in the drawings preferred embodiments. It should be understood, however, that the assembly is not limited to the precise arrangement, structures, features, embodiments, aspects, and methods shown, and the arrangements, structures, features, embodiments, aspects and methods shown may be used singularly or in combination with other arrangements, structures, features, embodiments, aspects and methods. The drawings are not necessarily drawn to scale and are not in any way intended to limit the scope of the invention, but merely to clarify various exemplary embodiments of the invention.

FIG. 3 is a diagram illustrating a LH extended mirror mounting assembly comprising a cross view mirror mounting arm, a rear view mirror mounting arm, a support brace, a mirror arm mount casting and support posts or spacers according to some embodiments of the present invention.

FIG. 4 is a diagram illustrating a top view of the extended mirror mounting assembly of FIG. 3.

FIGS. 5-9 are diagrams illustrating portions of the extended mirror mounting assembly of FIG. 3. Some of the drawings illustrate sectional compositions and/or partial sectional compositions of some embodiments of the present invention.

DETAILED DESCRIPTION OF THE EMBODIMENTS

Figure 1:
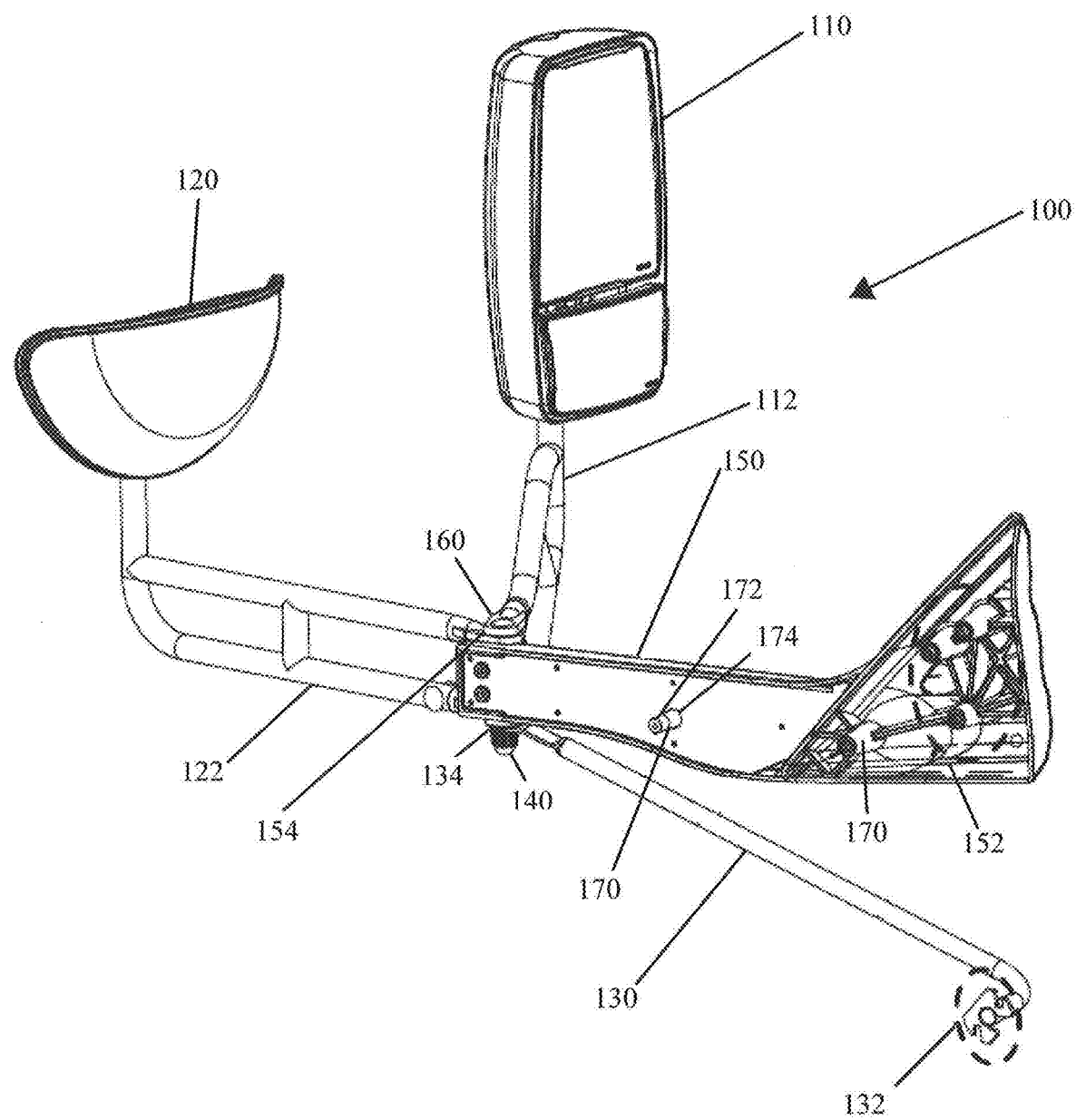
FIG. 1 is a diagram illustrating a RH extended mirror mounting assembly comprising a cross view mirror mounting arm, a rear view mirror mounting arm, a support brace, a mirror arm mount casting and support posts or spacers according to some embodiments of the present invention.

Before explaining at least one embodiment in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

For example, the specific sequence of the described process may be altered so that certain processes are conducted in parallel or independent, with other processes, to the extent that the processes are not dependent upon each other. Thus, the specific order of steps described herein is not to be considered implying a specific sequence of steps to perform the process. In alternative embodiments, one or more process steps may be implemented by a user assisted process and/or manually. Other alterations or modifications of the above processes are also contemplated. For example, further insubstantial approximations of the process and/or algorithms are also considered within the scope of the processes described herein.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

An exemplary installation for an extended mirror mounting assembly 200 to be mounted on the left fender of a vehicle according to some embodiments of the present invention can be provided. Different shaped and/or sized components and parts may optionally be used. In addition, the specific installation procedures may be revised, ordered differently and additional procedures added/removed, to achieve the overall installation of a stable extended mirror mounting assembly in accordance with some embodiments.

FIG. 1 is a diagram illustrating a A hardware kit for an extended mirror mounting assembly according to some embodiments of the present inventions can be provided.

A rivnut installation according to some embodiments of the present invention can be provided. Holes are drilled in preparation for the installation of the extended mirror mounting assembly. A rivnut is installed. It is preferable that any rough edges be deburred. For newly drilled holes, a rust inhibitor is preferably be applied. A lower mounting hole location according to some embodiments of the present invention can be provided.

A mounting LH mirror assembly according to some embodiments of the present invention can be provided. A hole position for the lateral support post according to some embodiments of the present invention can be provided. A hole for additional mounting post according to some embodiments of the present invention can be provided.

A hood hinge hardware location according to some embodiments of the present invention can be provided. In preparation for mounting the mirror assembly to the vehicle, hood hinge nuts and bolts behind fender are preferably located.

Hood hinge bolts and weld nuts according to some embodiments of the present invention. A support plate can be mounted on bolts. Weld nuts can be rested and conical washer nuts are preferably be tighten by hands. A mount support plate according to some embodiments of the present invention can be provided.

A spacer location according to some embodiments of the present invention can be provided.

An extended mirror mount assembly according to some embodiments of the present invention can be provided.

A 1/4-20 screw assembly according to some embodiments of the present invention can be provided. Screws can be assembled into the support plate through the lateral support post or spacer.

A support plate assembly with extended mirror mount according to some embodiments of the present invention can be provided. The support plate can be adjusted to align the self-clinching nut with screw. The clinching washer nuts can be tighten.

A lower support brace assembly according to some embodiments of the present invention can be provided. The lower support brace can be assembled using bolts and washers with nuts. A grommet can be inserted.

An extended mirror mounting assembly attached to a vehicle according to some embodiments of the present invention can be provided. The mirror heads can be adjusted as required.

A spacer or support post is contemplated to provide a bridge between the extended mirror mounting assembly and the vehicle to provide further stability to the extended mirror mounting assembly. In some embodiments, different configured or shaped spacers are optionally used or the spacer can be omitted.

The chassis, interior body panel support structure and/or front side portion of the engine block support structure is located on the area to be covered by the side fender and/or side body panel when assembled. The front side portion of the engine block support structure and the side body panel have side door upper hinge attachment holes and side door lower hinge attachment holes. The front side portion of the engine block support structure and the side body panel each have a side body panel attachment hole. In some embodiments, before the extended mirror mounting assembly is attached to the vehicle, the side door upper hinge attachment holes are configured to be used for attaching a side door upper hinge member to the engine block support structure or other structural location by means of, for example, screws, and the side door lower hinge attachment holes are configured to be used for attaching a side door lower hinge member to the engine block support structure or other structural location support by means of, for example, screws. The side body panel attachment hole is configured to be used for attaching the side body panel to the engine block support structure or other structural location by means of, for example, a screw. Other standard connection devices can be used instead of and/or in addition to the screws, including bolts, welds, clamps, adhesives and the like.

An right fender (RH) extended mirror mounting assembly can be achieved by reversing the LH extended mirror mounting assembly and can be understood by a person skilled in the art. In some embodiments, the extended mirror mounting assembly is configured to be mounted on the driver side of the vehicle. In some embodiments, the extended mirror mounting assembly is configured to be mounted on the passenger side of the vehicle. In some embodiments, the extended mirror mounting assembly is configured to be mounted on the front side portion of the engine block support structure or other structural location, and the extended mirror mounting assembly is connected to the front side portion through holes provided on the side body panel.

Additionally and/or alternatively, the extended mirror mounting assembly may be mounted on other portions of the vehicle including, but not limited to, the back side (rear) of the vehicle, a different part of the body panel, or any other portion of the vehicle that may be advantageous to the desired mirror application using a variety of mounting options, such as screws, glue, mounting tape, straps, elastic straps, and the like.

The extended mirror mounting assembly may optionally be mounted on various types of vehicles including but not limited to commercial, industrial, or passenger vehicles. In some embodiments of the extended mirror mounting assembly, the base end portions of the upper support member, lower support member and/or lateral support brace or post are connected through a portion of the body panel, chassis and/or the engine block support structure or other structural location through one or more openings provided on a side of the vehicle for direct connection to/through the body panel, the chassis and/or the engine block support structure or other structural location, and/or for connection to a different portion of the vehicle that provides support and/or reduced vibration on the assembly and/or the mirror.

In some embodiments, the lateral support brace or post is connected to a portion of the body panel capable of providing stability, such as a reinforced area, folded area or frame area of the body panel and/or a structural location of the vehicle, for example, by using a mounting bracket configured such as one of the embodiments disclosed in U.S. Pat. No. 8,333,479, incorporated herein by reference in its entirety.

In some embodiments, the extended mirror mounting assembly includes more than one lateral support brace or post. For example, where one lateral support brace or post provides structural support for the extended mirror mounting assembly through a connection point to a structural location optionally through the body panel, one or more additional lateral support brace(s) or post(s) may provide stabilization and connect to the vehicle at a structural location, for example, by routing the brace or post around or through the hood of the vehicle and/or between the hood and around the body panel under a level of the hood for connection to a portion of the vehicle, such as the interior of the body panel and/or engine support and/or a structural portion, as illustrated for example in FIGS. 4 and/or 7 of U.S. Pat. No. 8,333,479, incorporated herein by reference in its entirety. These secondary lateral support braces or posts may, but need not, attach to the extended mirror mounting assembly in a similar fashion to the primary lateral support, for example, via bolts, welds, clamps, adhesives and the like, or some combination thereof.

FIG. 1 is a diagram illustrating a RH extended mirror mounting assembly 100 comprising a cross view mirror mounting arm, a rear view mirror mounting arm, a support brace, a mirror arm mount casting and support posts or spacers according to some embodiments of the present invention.

Referring to FIG. 1, in some embodiments, an extended mirror mounting assembly 100 for mounting one or more mirrors 110, 120 to a vehicle comprises one or more mirror mounting arms 112, 122, each including an arm portion and configured to support the mirrors 110, 120, a lower support member 130 including a lower base end portion 132 configured to be connected to the vehicle at a first vehicle location and a lower distal end portion 134 configured to be connected to the mirror mounting arms 112, 122 at a first mount location 140, an upper support member 150 including an upper base end portion 152 configured to be connected to the vehicle at a second location and an upper distal end portion 154 configured to be connected to the mirror mounting arms 112, 122 at a second mount location 160, and a lateral support member (or post or spacer) 170 including a lateral base end portion 172 configured to be connected to the vehicle at a third vehicle location and a lateral distal end portion 174 configured to be connected to the upper support member 150.

In some embodiments, a mounting support plate is configured to be connected to the lateral support member and supported by a fourth structural location, frame or engine bay of the vehicle.

In some embodiments, a second lateral support member (or post or spacer) 170 including a lateral base end portion is configured to be connected to the vehicle at a fourth vehicle location and a lateral distal end portion is configured to be connected to the upper support member 150. The lower distal end portion 134 of the lower support member 130 and the upper distal end portion 154 of the upper support member 150 are connected to the upper support member 150. In some embodiments, the upper support member 150 is connected substantially perpendicular to at least a portion of the lower and/or upper support member. In some embodiments, the upper support member 150 is in the form of a single-piece lateral mounting casting. The single-piece lateral mounting casting can have a substantially triangular shape for connection to the frame or structural area of the vehicle.

In some embodiments, the extended mirror mounting assembly 100 is configured to mount a rear view mirror 110. In other embodiments, the extended mirror mounting assembly 100 is configured to mount a cross view mirror 120. In other embodiments, the extended mirror mounting assembly 100 is configured to mount both a rear view mirror 110 and a cross view mirror 120.

In some embodiments, the lateral support members (or posts or spacers) 170 are positioned between the upper support member 150 of the extended mirror mounting assembly 100 and the vehicle to reduce vibration and/or provide further stability to the extended mirror mounting assembly 100 especially, for example, when the vehicle is moving. In some embodiments, one end of the one or more posts or spacers 170 is attached to the upper support member 150 while the other end of the one or more posts or spacers 170 is attached to the vehicle.

In some embodiments, a similar mirror mounting assembly is mounted on the passenger side of the vehicle based on viewing objectives and/or requirements, i.e., the driver side rear view mirror is viewed through the door and the passenger side rear view mirror is viewed through the windshield by the driver.

Figure 2:
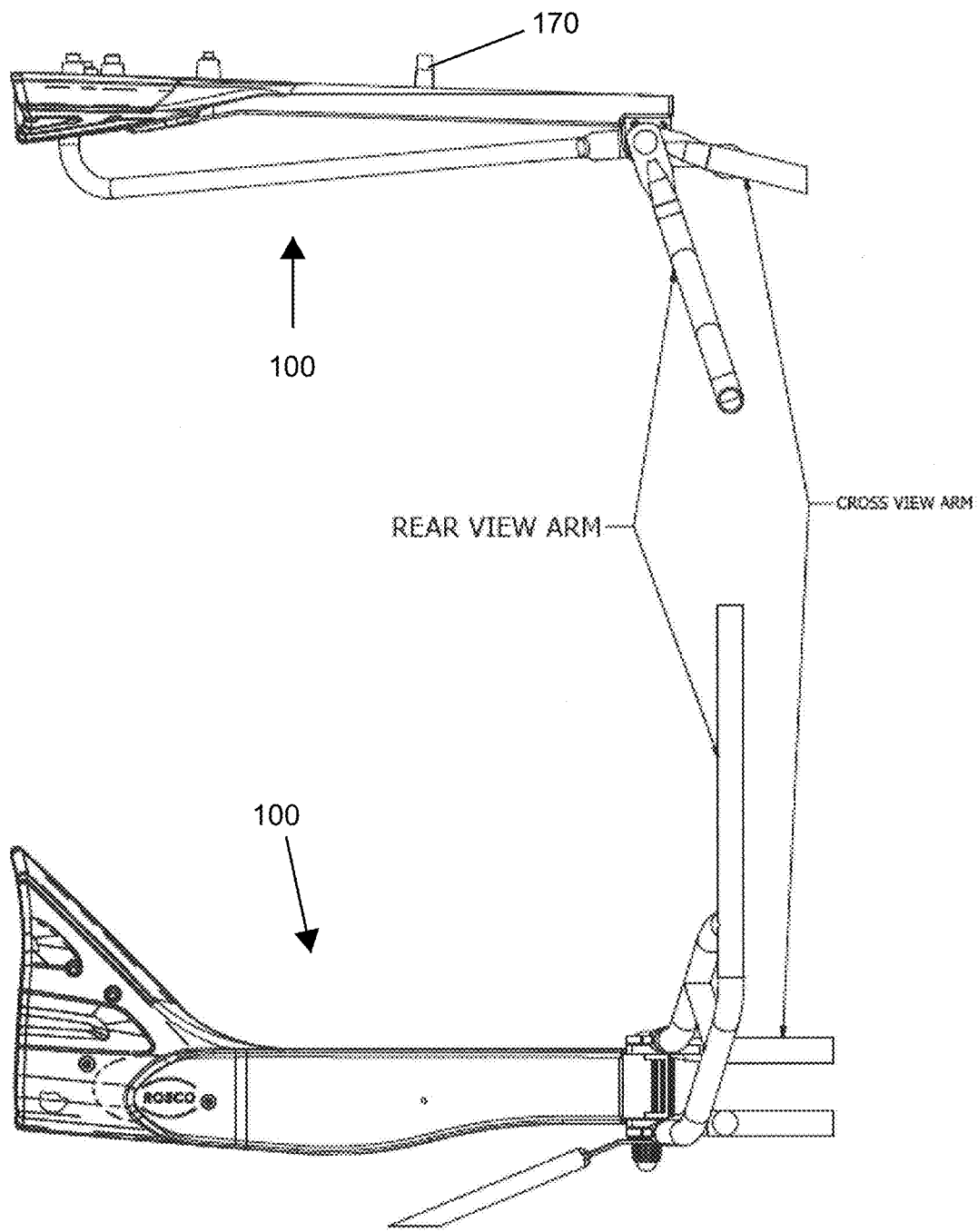
FIG. 2 is a diagram illustrating top and perspective views of the extended mirror mounting assembly of FIG. 2.

FIG. 2 is a diagram illustrating top and perspective views of the extended mirror mounting assembly 100 of FIG. 1. The support posts or spacers 170 are provided to reduce vibration of the extended mirror mounting assembly while the vehicle, where the extended mirror mounting assembly is mounted, is moving.

FIG. 3 is a diagram illustrating a LH extended mirror mounting assembly 200 comprising a cross view mirror mounting arm, a rear view mirror mounting arm, a support brace, a mirror arm mount casting and support posts or spacers according to some embodiments of the present invention. FIG. 4 is a diagram illustrating a top view of the extended mirror mounting assembly of FIG. 3. FIGS. 5-9 are diagrams illustrating portions of the extended mirror mounting assembly of FIG. 3. Some of the drawings illustrate sectional compositions and/or partial sectional compositions of some embodiments of the present invention.

Notes 1-4 presented in FIGS. 3-9 are listed below:
Notes:
1. Apply permanent adhesive on bolt threads when assembling casting.
2. Finish: optional textured black.
3. Components used with the assembly.
4. Mount mirror head upper clamp flush with the arm.
Table 1 lists the exemplary parts labeled in FIGS. 3-9.

TABLE 1

| Item | Quantity | Description |
|---|---|---|
| 1 | 1 | CROSSVIEW ARM, ALUMINUM TUBE, BLACK |
| 2 | 4 | BRASS WASHER |
| 3 | 1 | WELDMENT ASSY, LH, SUPPORT BRACE, STEEL, BLACK |
| 4 | 1 | FLAT WASHER |
| 5 | 1 | LOCK HEX NUT, STEEL, W/NYL INSERT, ZINC YELLOW |
| 6 | 2 | CAP, FOR HEX NUT/BOLT, BLCK |
| 7 | 2 | RUBBER PLUG |
| 8 | 1 | RUBBER GROMMET, ELONGATED |
| 9 | 2 | CARRIAGE BOLT |
| 10 | 1 | MIRROR HEAD |
| 11 | 1 | MIRROR HEAD, UPRIGHT |
| 12 | 1 | EXTENDED CASTING, LH, |
| 13 | 2 | PATCH BLOCK |
| 14 | 1 | BACK PLATE, EXTENDED CASTING TRANSIT |
| 15 | 1 | TUBULAR ARM, NON DETENT, FENDER MOUNT, RH, BLACK |
| 16 | 1 | SCREW KIT, LH, FOR EXTENDED CASTING |
| 17 | 8 | SOCKET |
| 18 | 6 | PAN HD SCREW |
| 19 | 1 | PLUG/GROMMET WITH KNOCK OUT |

In some embodiments such as those illustrated in FIGS. 3-9, a rear view mirror mounting arm and a cross view mirror mounting arm are connected to a single casting, multi-component or conjoining mechanism, such as a support bracket and/or a hinge or pivot mechanism.

Figure 10:
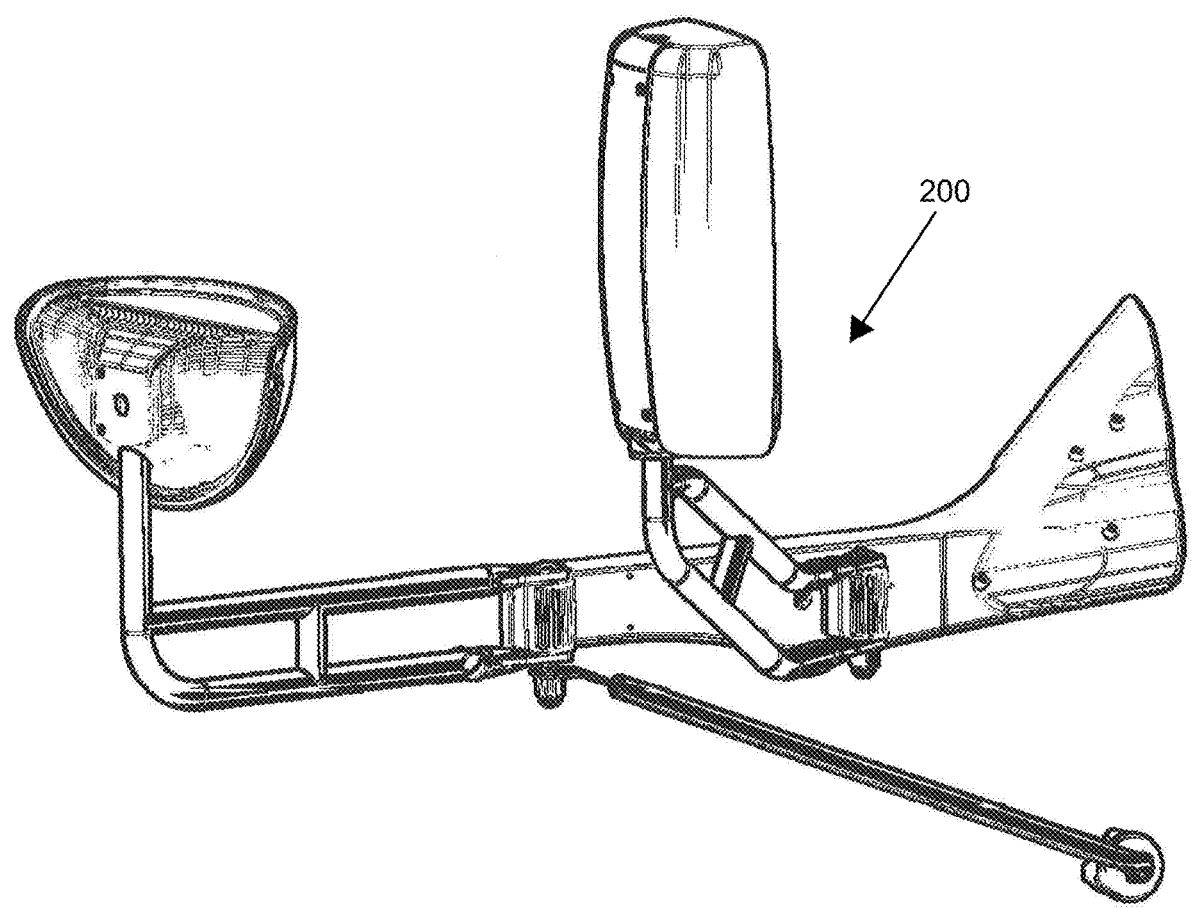
FIGS. 10-11 are diagrams illustrating a LH extended mirror mounting assembly according to some embodiments of the present invention. A spacer is shown in some diagrams.
Figure 11:
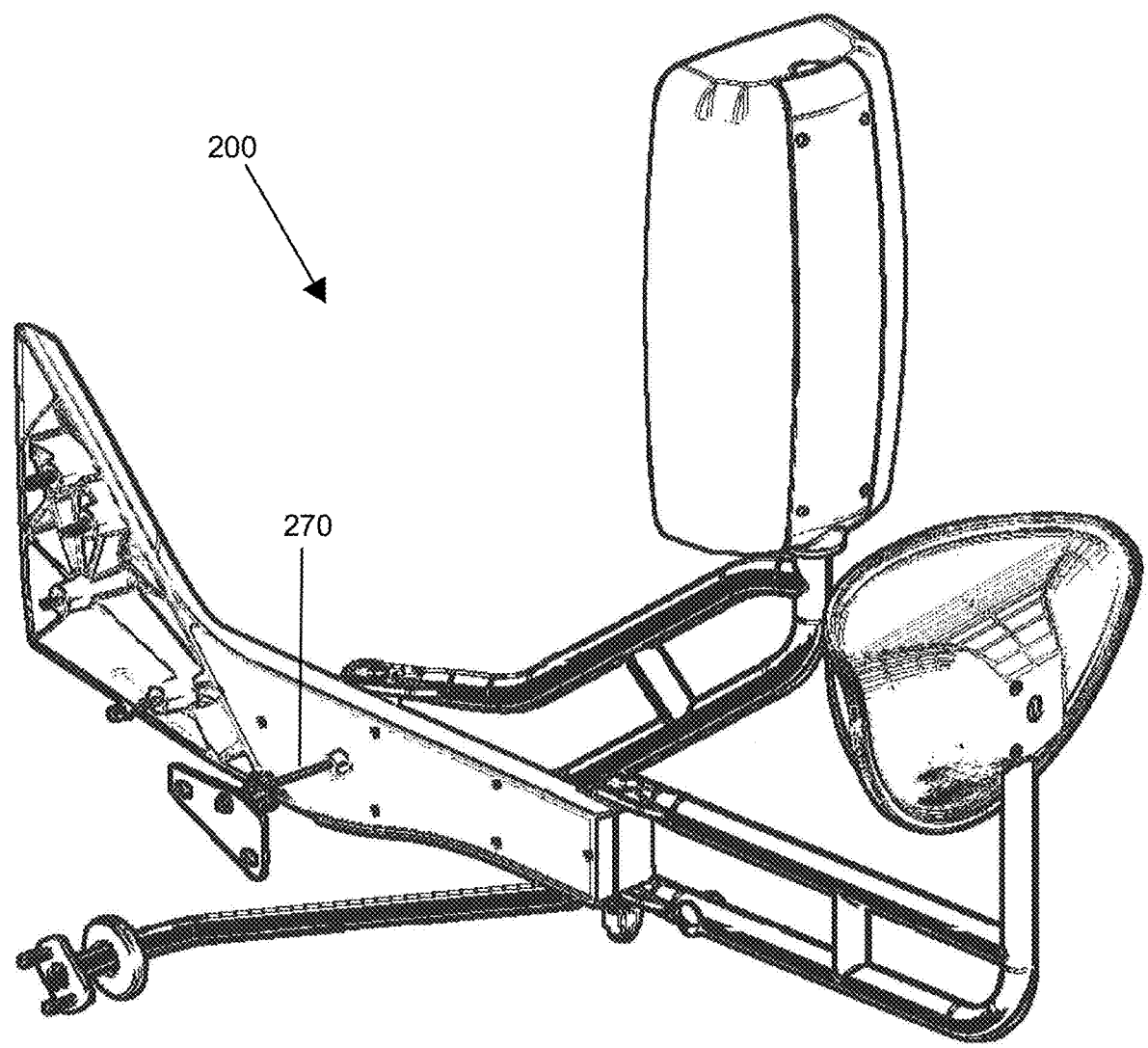

FIGS. 10-11 are diagrams illustrating a LH extended mirror mounting assembly 200 according to some embodiments of the present invention. A spacer 270 is shown in some diagrams and may be used.

Figure 12:
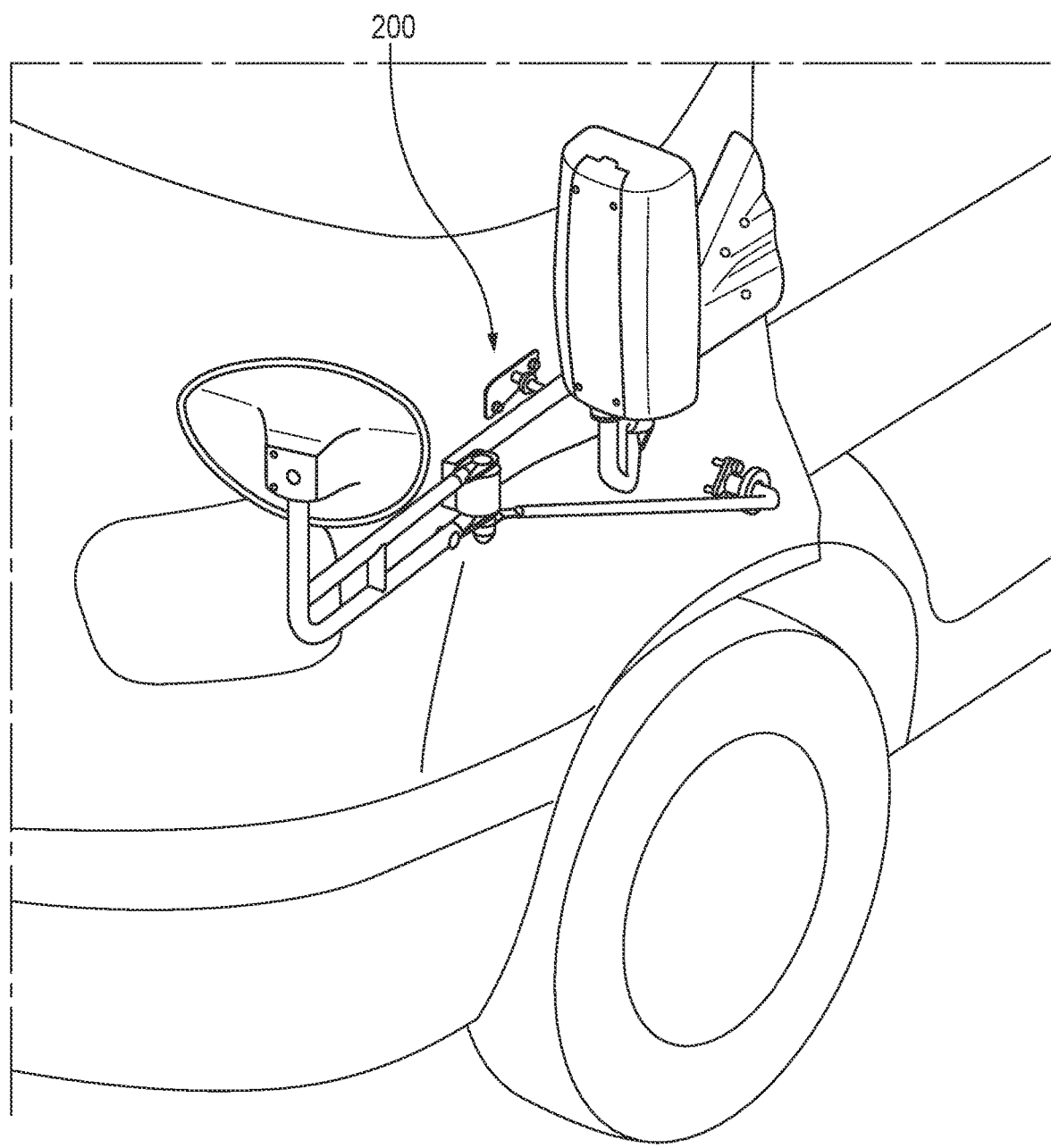
FIGS. 12-13 are diagrams illustrating a LH extended mirror mounting assembly attached to a vehicle (shown in shadow) according to some embodiments of the present invention. A spacer is shown in some diagrams.
Figure 13:
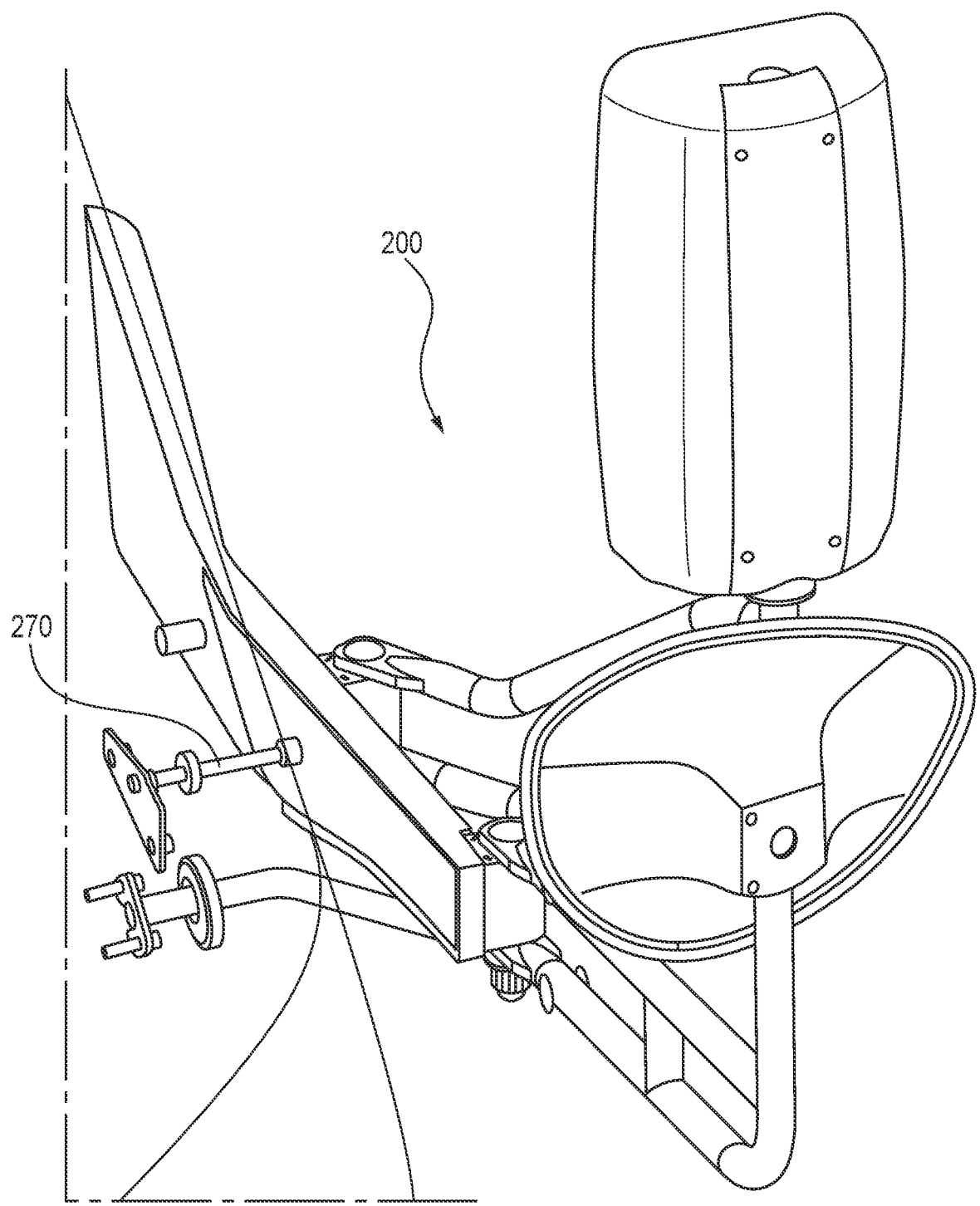

FIGS. 12-13 are diagrams illustrating a LH extended mirror mounting assembly 200 according to a vehicle (shown in shadow) according to some embodiments of the present invention. A spacer 270 is shown in some diagrams.

Figure 14:
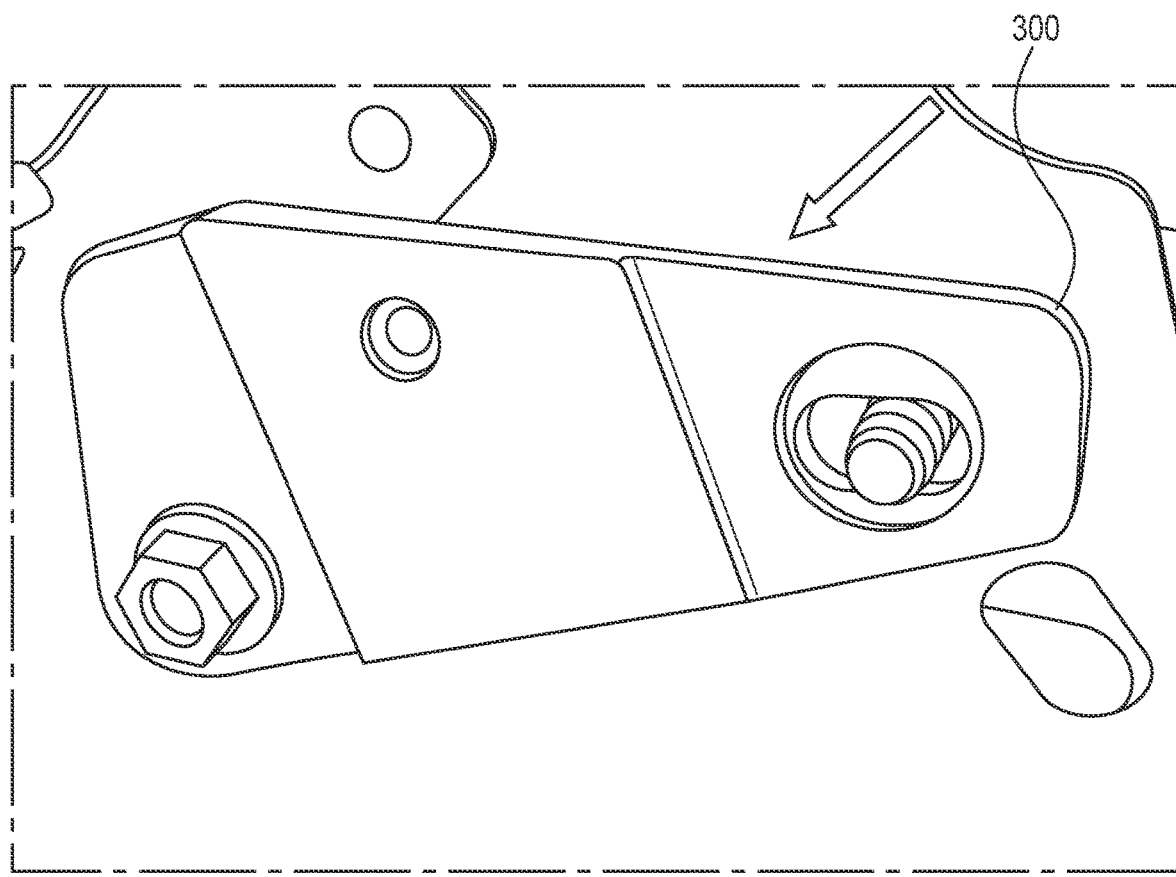
FIG. 14 is a diagram illustrating a support plate according to some embodiments of the present invention.

FIG. 14 is a diagram illustrating a support plate 300 according to some embodiments of the present invention. In FIG. 14, the support plate 300 is mounted on bolts which rest on weld nuts and the conical washer nuts are tightened to secure the support plate.

FIGS. 15A-15D are diagrams illustrating a support plate 400 according to some embodiments of the present invention. FIGS. 15A-15D show the installer inserting the support plate 400 behind the fender. In some embodiment, the support plate 400 advantageously includes one or more open slots or open receiving sections 402, 404 (see, for example, arrows in FIG. 15A) that allow the installer to drop the plate from above, instead of having to place the support plate in front of the screws to facilitate installation. In the embodiment shown in FIGS. 15A-15D, the support plate 400 is a polygon that can be defined by an X-axis and a Y-axis. The polygon has a peripheral and a middle portion surrounded by the peripheral. The support plate 400 has a first open slot 402 and a second open slot 404 that each open slot is cut from the peripheral and further into the middle portion 406. Each open slot has an opening, an end portion, and a channel in between the opening and the end portion. The opening, the channel, and the end portion of each open slot are sized to receive a corresponding bolt. Each of the end portion has a center. The distance between the center of the end portion of the first open slot and the center of the end portion of the second open slot is substantially the same as the distance between the two bolts designated to install the support plate.

Each open slot has a facing direction. In one embodiment, the first open slot 402 has its facing direction aligned with the X-axis while the second open slot 404 has its facing direction aligned with the Y-axis. In one embodiment, the facing direction of the second open slot 404 is facing downward.

A tab 408 (see, for example, arrow with circle in FIG. 15A) can be designed to facilitate holding the plate 400 during installation while simultaneously avoiding interference and/or creating an obstruction. The tab 408 has a longitudinal direction. In one embodiment, the longitudinal direction of the tab 408 is aligned with the Y-axis. Alternative tab configurations, segments and/or sections for the support plate can be used to facilitate the grip of the installer. In some embodiments, the support plate can be coated with a gripping substance and/or include a rubber extension to facilitate installation and/or insertion.

Figure 15A:
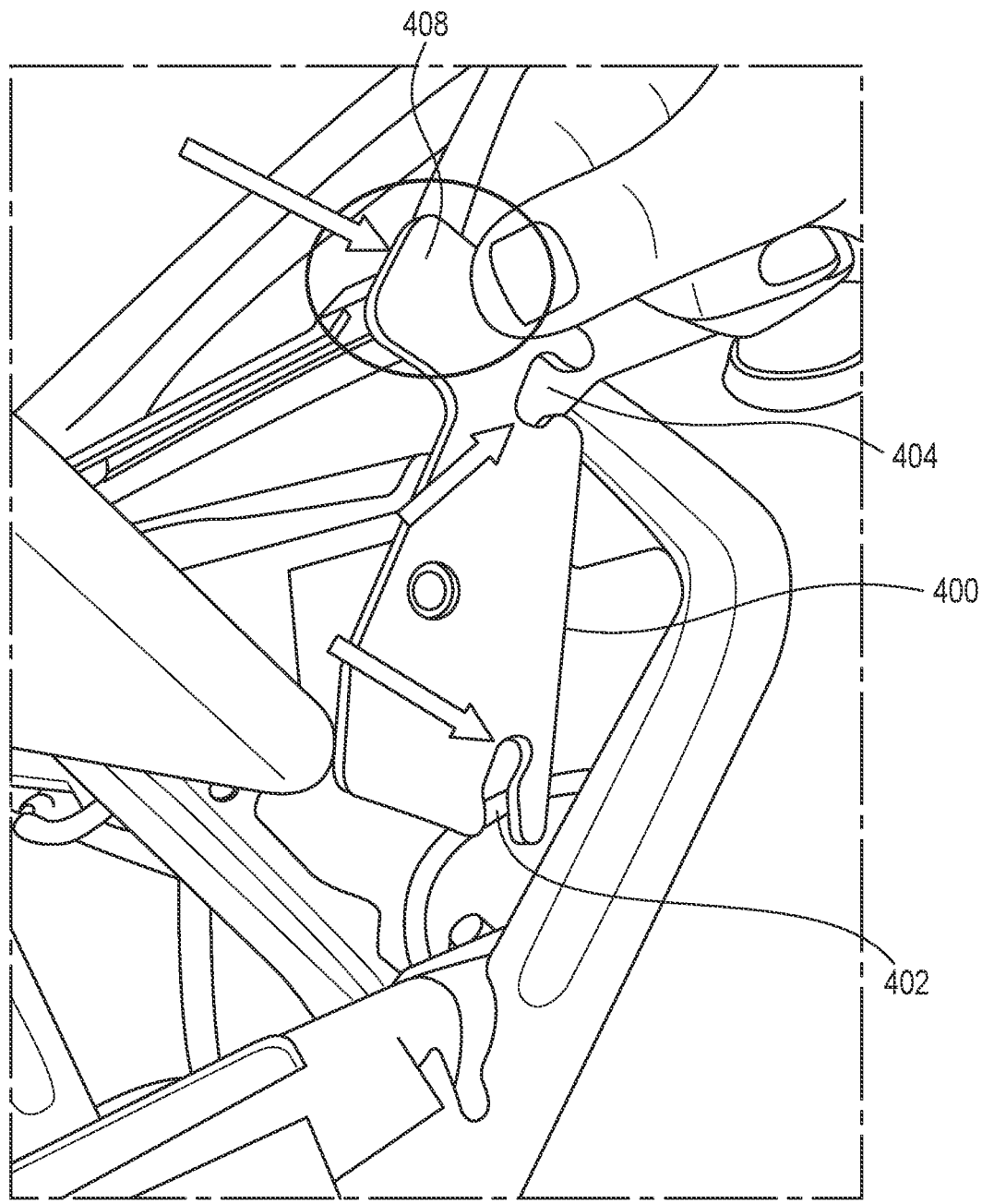
FIGS. 15A-15D are diagrams illustrating an installation process for a support plate according to some embodiments of the present invention.
Figure 15B:
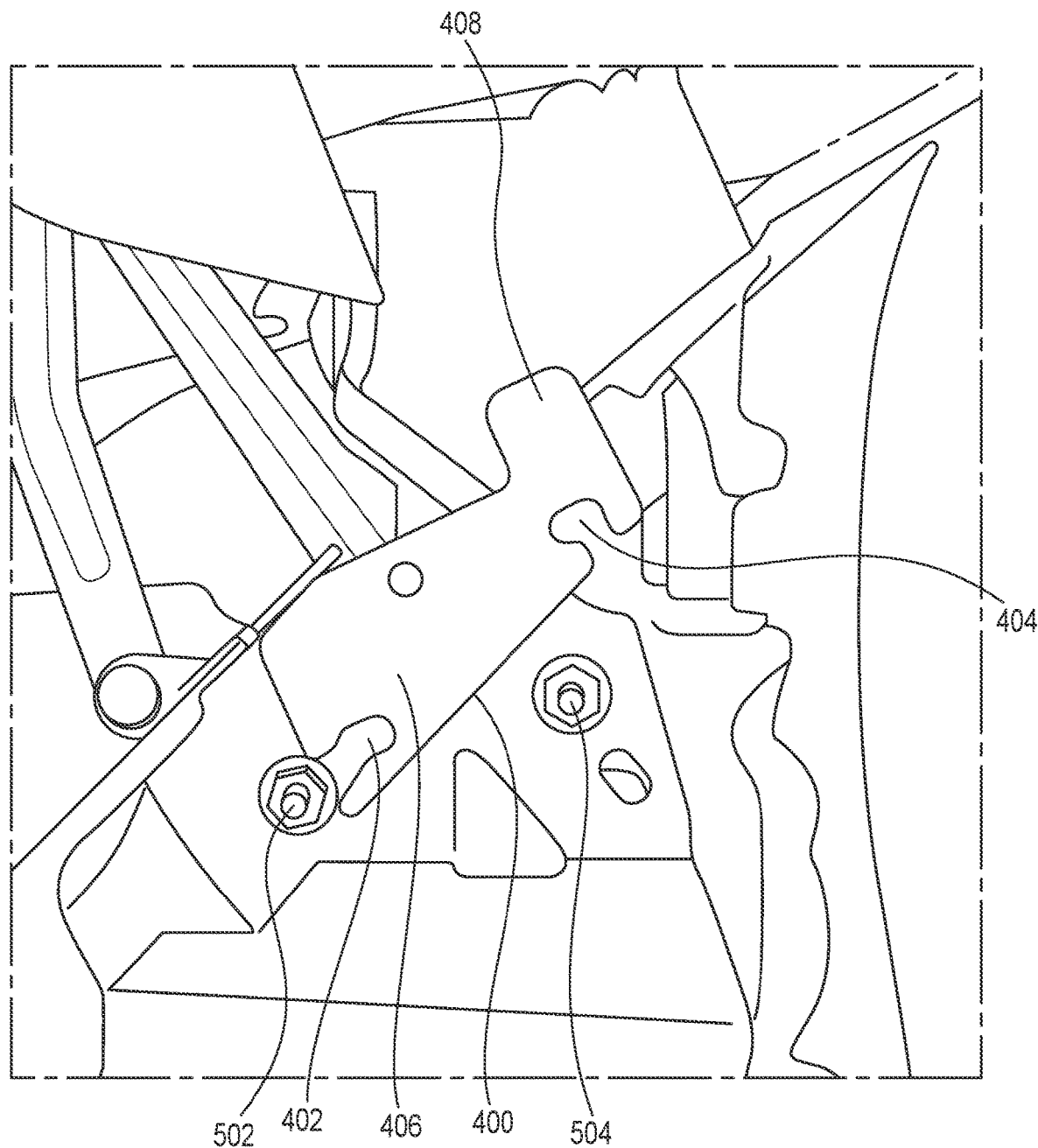
Figure 15C:
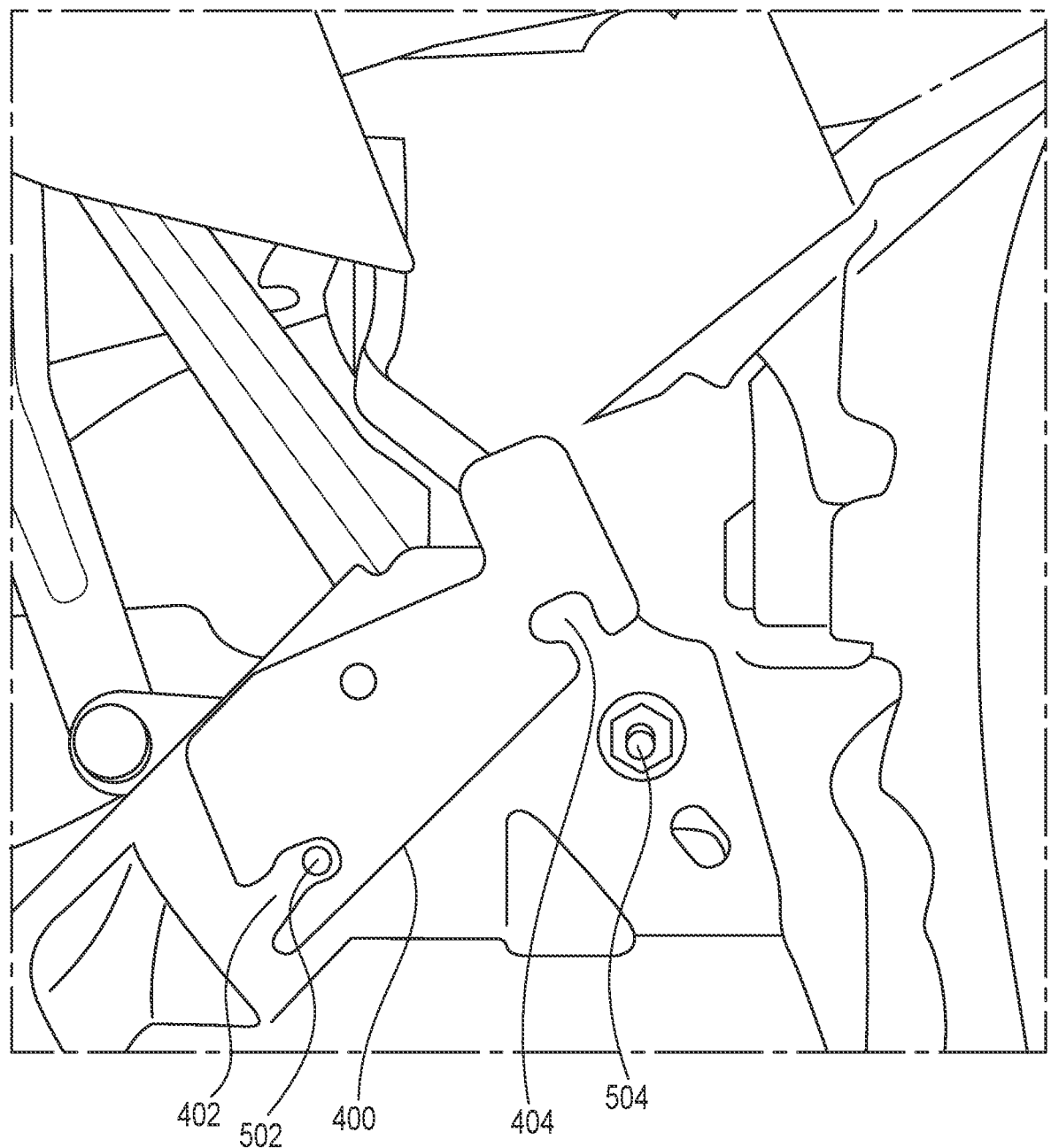
Figure 15D:
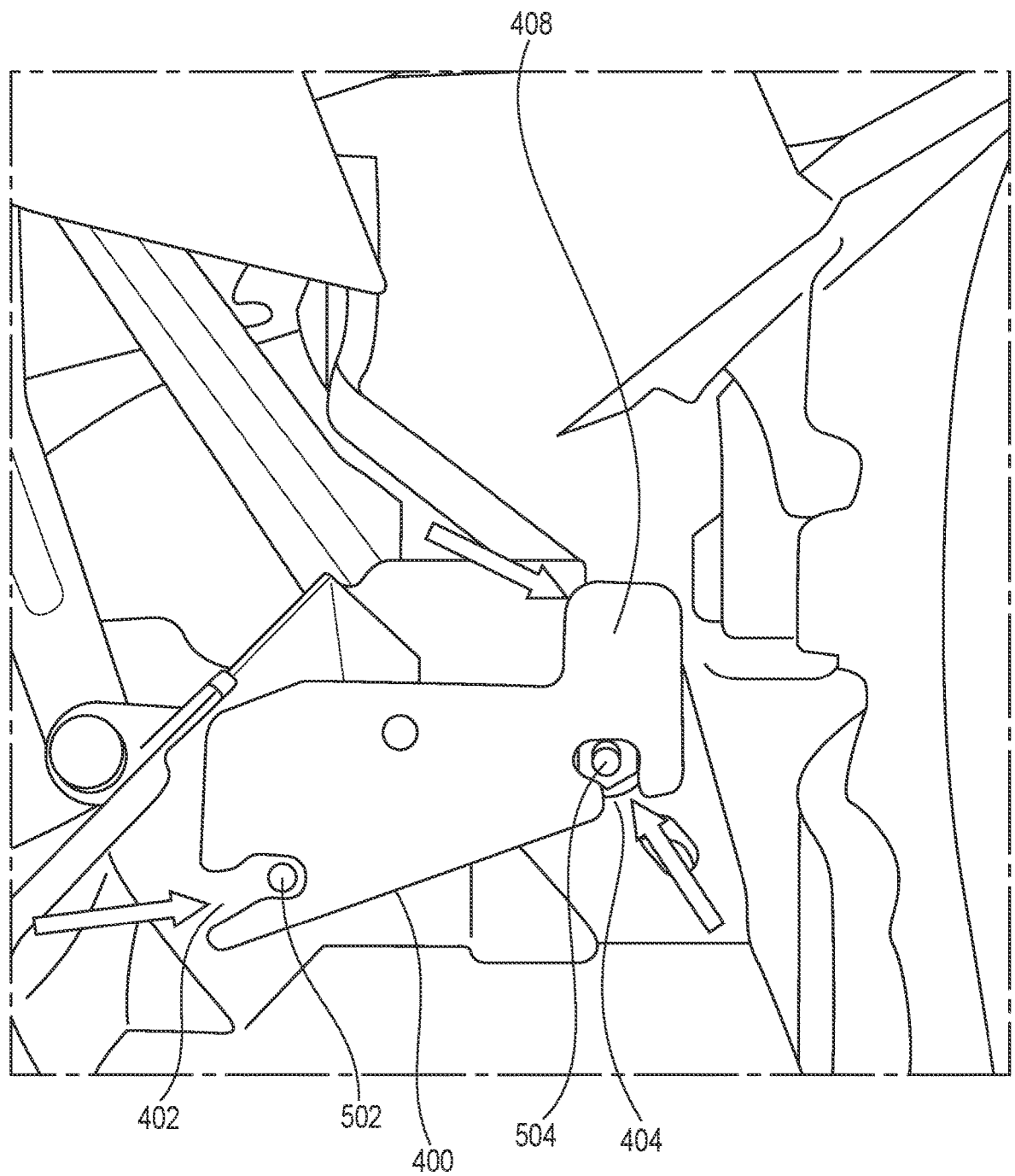

During installation, the installer can first install both the first and second bolts 502, 504 for mounting the support plate 400. The installer can hold the tab 408 and have the first open slot 402 facing the first bolt 502 as shown in FIG. 15B. Then, the support plate 400 can be pushed along the X-axis direction of the support plate to have the first bolt 502 received by the first open slot 402 as shown in FIG. 15C. Then, the installer can drop the support plate 400 and the second bolt 504 will be received by the second open slot 404 as shown in FIG. 15D. Thus, during the installation of the support plate with open slot configuration, one or more parts of the vehicle, such as the exterior fender and/or the wheel cover, do not need to be removed. Note that in FIGS. 15A-15D, the vehicle exterior fender or wheel cover was removed for clarity. In some embodiments, using the support plate and process described in FIGS. 15A-15D enables the installation of the support plate without removing one or more parts of the vehicle, such as the exterior fender and/or the wheel cover. In some embodiments, one or more open slots or receiving areas/sections are used for the support plate. In some embodiments, a trigger-like shape for the support plate is used which includes a gripping tab to facilitate installation. In some embodiments, alternate shapes for the support plate can be used to fit within the installation area of the vehicle.

In some embodiments, the extended mirror mounting assembly includes a cross view pivot mechanism for a cross view mirror mounting arm and a rear view pivot mechanism for a rear view mirror mounting arm. The cross view mirror pivot mechanism is positioned closer to the front of the vehicle than the rear view mirror pivot mechanism. Multiple-pivot or multiple-conjoining mechanism mirror mounting assemblies are contemplated on the passenger side of the vehicle as well. Relative locations of the pivots may be modified based on viewing constraints. For example, the driver side rear view mirror might be viewed through a door window, while the passenger side rear view mirror might be viewed through the windshield.

Figure 16:
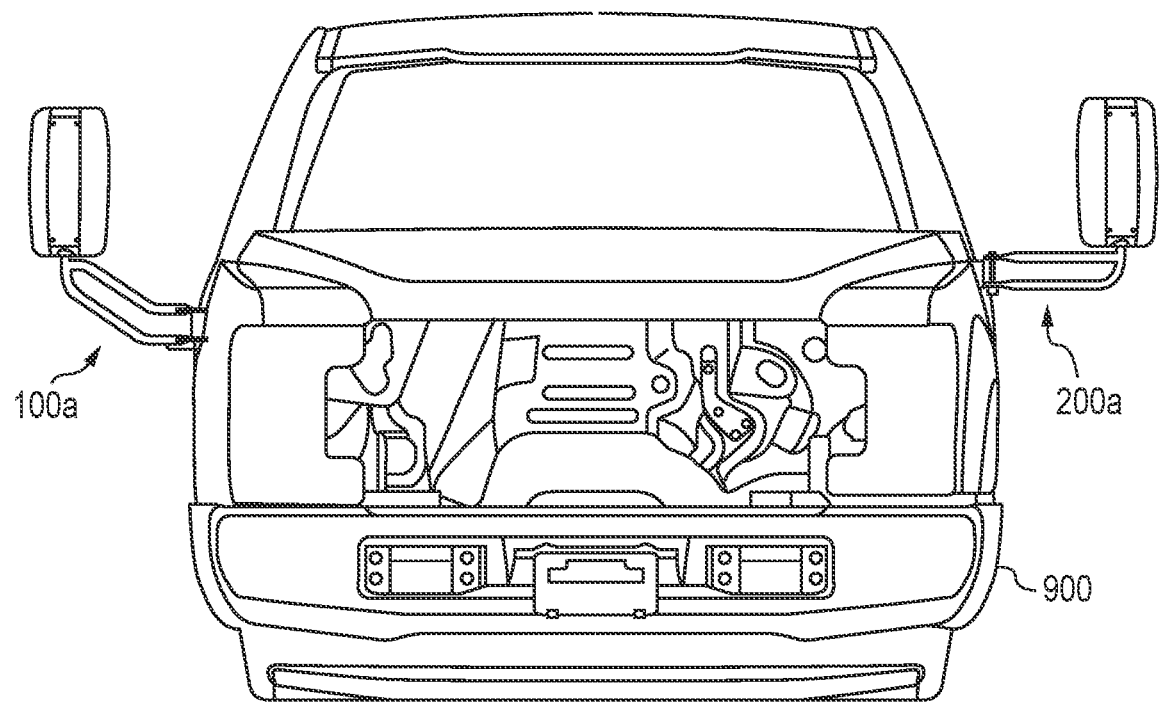
FIG. 16 is a front view of a vehicle portion illustrating a minor system comprising a LH (road) side mirror assembly and a RH (curb) side mirror assembly for RH door delete option according to some embodiments of the present invention. The drawing illustrates sectional compositions and/or partial sectional compositions of some embodiments of the present invention.

FIG. 16 is a front view of a vehicle portion 900 illustrating a mirror system comprising a LH (road) side mirror assembly 200a and a RH (curb) side mirror assembly 100a for RH door delete option according to some embodiments of the present invention. The drawing illustrates sectional compositions and/or partial sectional compositions of some embodiments of the present invention. The LH side mirror assembly 200a can comprise a door-mount design, an aluminum casting, a black powder coat finish, and a mirror head with available options (for example, heated, remote, LED turn signal, etc.). The RH side mirror assembly 100a (RH door delete option) can comprise a pillar-mount design, a rigid steel support bracket, a black powder coat finish, and a mirror head with available options (for example, heated, remote, LED turn signal, etc.).

Figure 17:
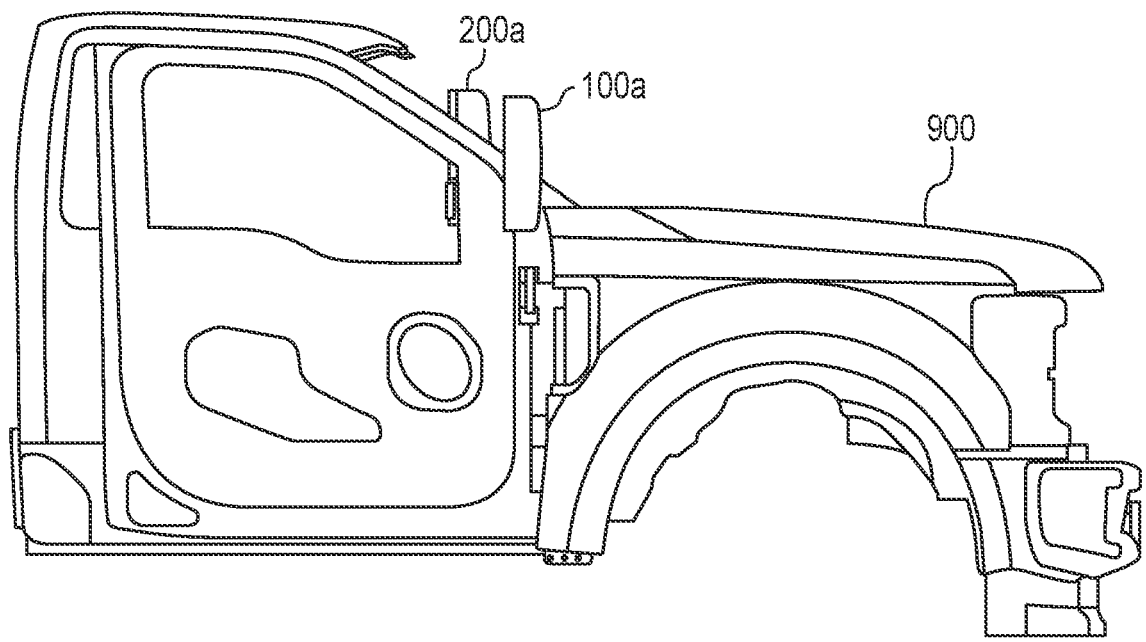
FIG. 17 is a diagram illustrating a RH rigid support bracket for mounting the RH side minor assembly according to some embodiments of the present invention.

FIG. 17 is a diagram illustrating a right side view of the vehicle portion of FIG. 16.

Figure 18:
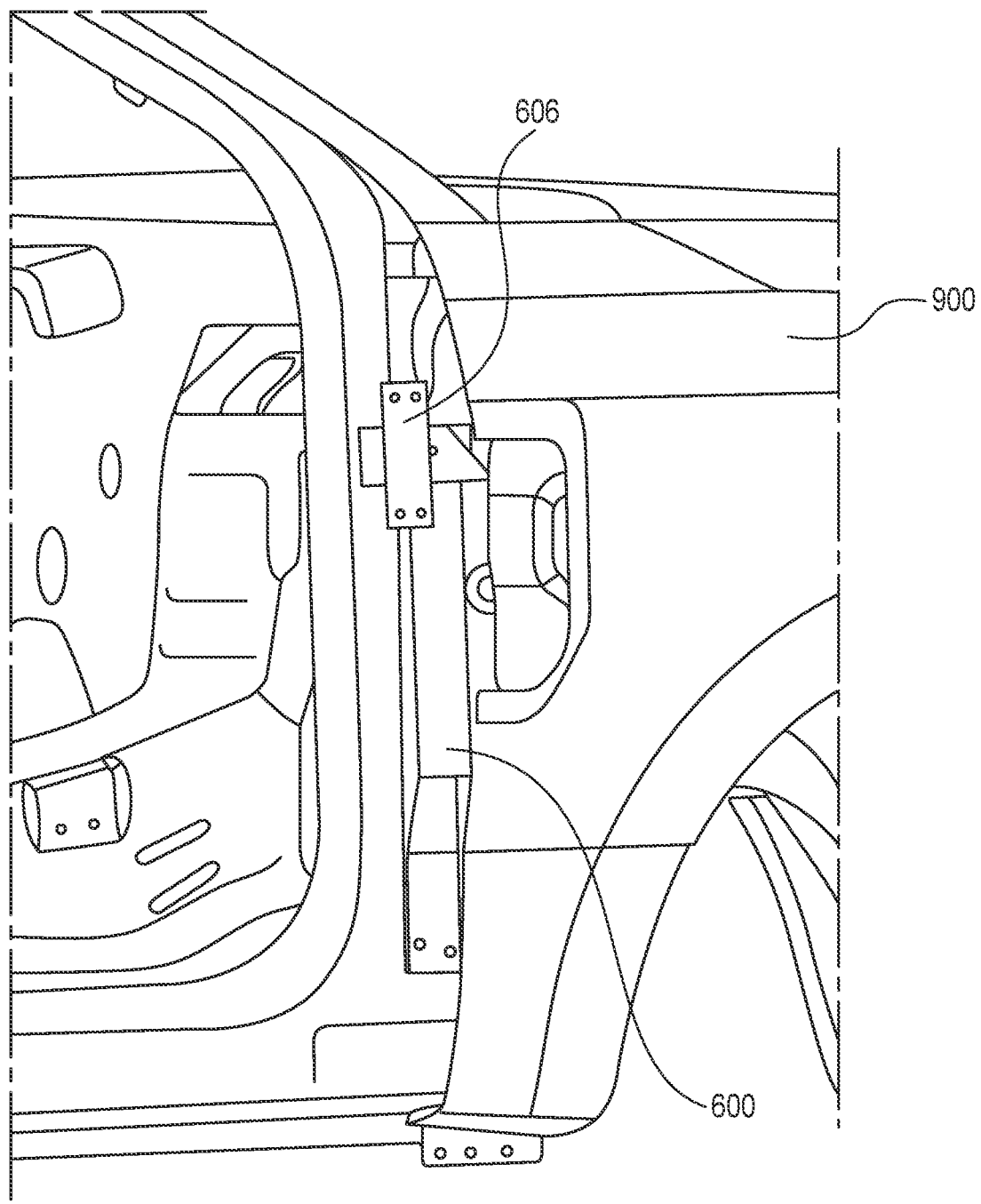
FIG. 18 is a diagram illustrating the RH side mirror assembly is mounted to the RH rigid support bracket according to some embodiments of the present invention.

FIG. 18 is a diagram illustrating a RH rigid support bracket or member 600 for mounting the RH side mirror assembly according to some embodiments of the present invention. The rigid support bracket 600 can be mounted to the vehicle's frame, instead of the RH door, to support the RH side mirror assembly. In one embodiment, the rigid support bracket 600 is configured to be mounted to the frame of the vehicle at a first vehicle location and a second vehicle location, wherein the first vehicle location and the second vehicle location form a line that is substantially vertical to the ground. In one embodiment, the rigid support bracket is made of steel.

Figure 19:
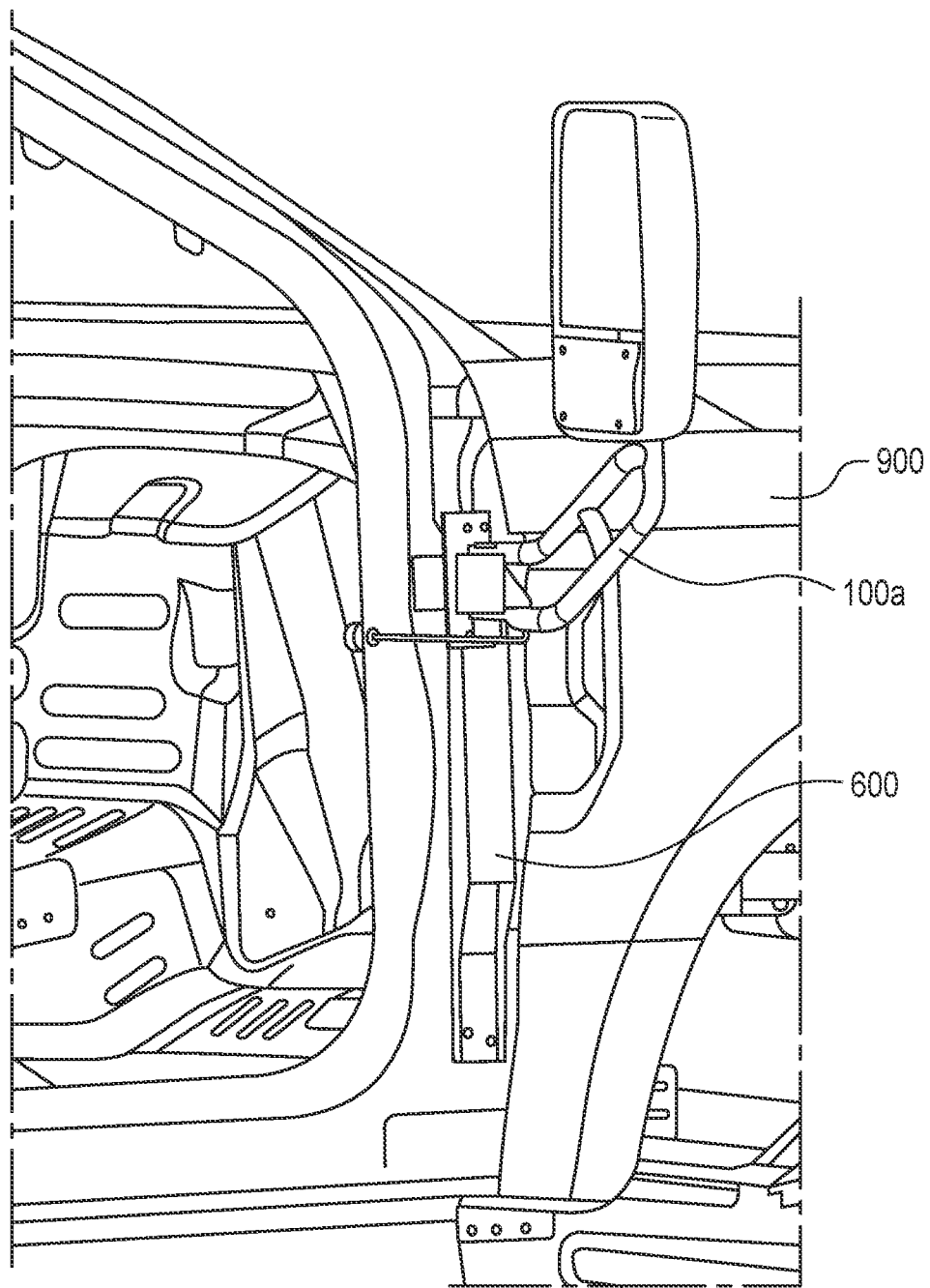
FIG. 19 is a diagram illustrating an enlarged view of the RH rigid support bracket and a portion of the RH side mirror assembly of FIG. 18.

FIG. 19 is a diagram illustrating the RH side mirror assembly 100a is mounted to the RH rigid support bracket 600 according to some embodiments of the present invention. FIG. 48 is a diagram illustrating an enlarged view of the RH rigid support bracket and a portion of the RH side mirror assembly of FIG. 47. FIG. 49 is a diagram illustrating the RH rigid support bracket and a portion of the RH side mirror assembly from an angle different from that of FIG. 48. In one embodiment, the rigid support bracket 600 is fastened into existing four upper/lower door hinge nuts 902, 904 (refer also to FIG. 22, indicated by arrows) to add rigidity. The fastening can be performed by known methods. In one embodiment, the rigid support bracket is fastened into the four upper/lower door hinge nuts by using bolts.

Figure 20:
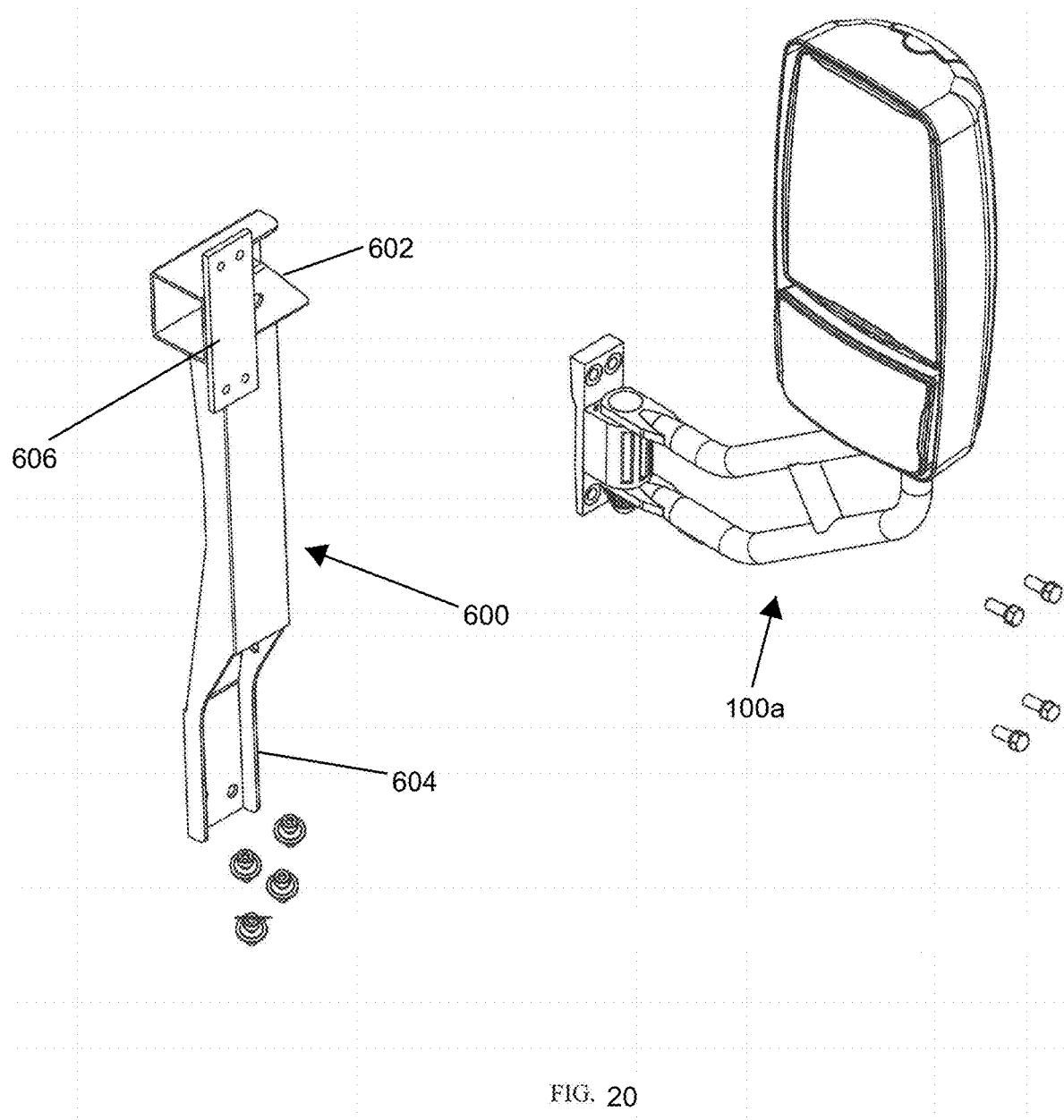
FIG. 20 is a diagram illustrating the RH rigid support bracket and the RH side mirror assembly according to some embodiments of the present invention.

FIG. 20 is a diagram illustrating the RH rigid support bracket 600 and the RH side mirror assembly 100a according to some embodiments of the present invention. In some embodiments, a rigid support member is configured to be mounted to a frame of the vehicle at a first vehicle location and a second vehicle location. The first vehicle location and the second vehicle location can form a line that is substantially vertical to the ground. The rigid support member is configured to be connected to the mirror mounting arm at a mount location 606. The rigid support member 600 can be fastened into the door hinge area 902, 904 of the vehicle when the hinged door is removed.

In some embodiments, the rigid support member 600 has an upper member 602 and a lower member 604. The mirror mounting arm can be mounted to the mount location 606 connecting to the upper member 602. The rigid support member can be fastened into the door hinge area 902, 904 of the vehicle through both the upper member 602 and the lower member 604.

The upper member 602 is an U-shaped structure having a longitudinal direction with the opening of the U-shaped structure facing the opposing direction of the door hinge area of the vehicle. The longitudinal direction of the U-shaped structure is substantially perpendicular to the line formed by the first vehicle location and the second vehicle location. A portion of the lower member is an U-shaped structure having a longitudinal direction with the opening of the U-shaped structure facing the door hinge area of the vehicle. The longitudinal direction of the U-shaped structure is substantially aligned with the line formed by the first vehicle location and the second vehicle location.

Figure 21:
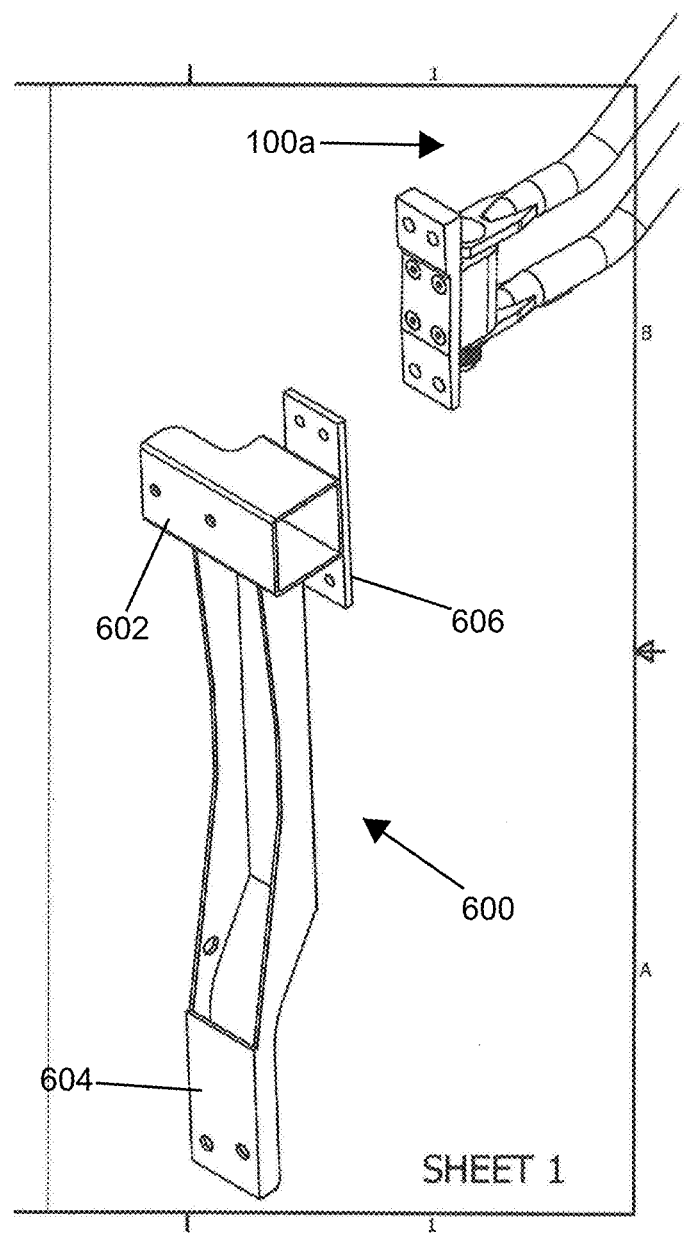
FIG. 21 is a diagram illustrating the RH rigid support bracket and a portion of the RH side mirror assembly from an angle different from that of FIG. 20.
Figure 22:
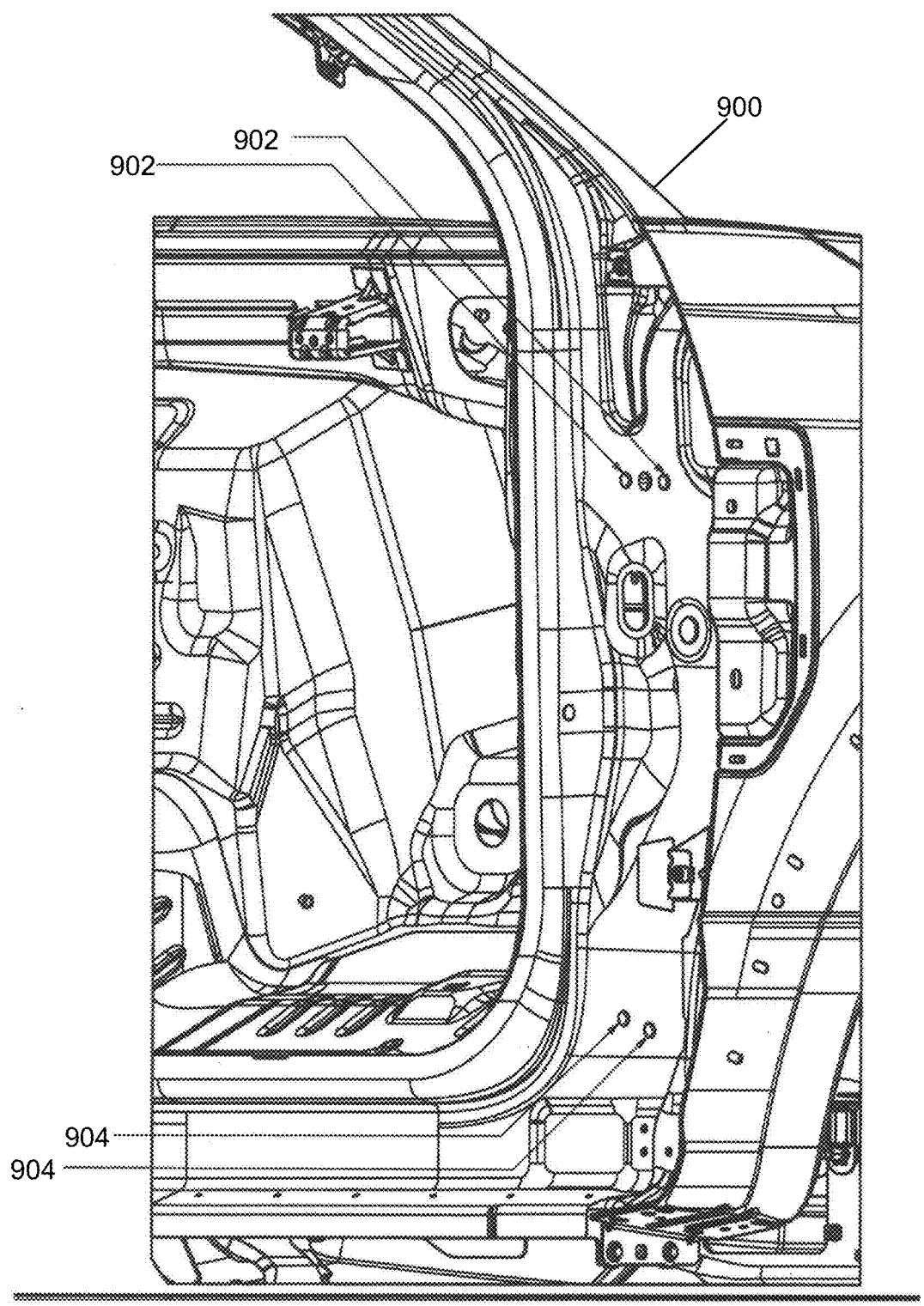
FIG. 22 is a diagram illustrating the right side of a vehicle portion with upper and lower door hinges for mounting the RH rigid support bracket according to some embodiments of the present invention.

FIG. 21 is a diagram illustrating the RH rigid support bracket 600 and a portion of the RH side mirror assembly 100a from an angle different from that of FIG. 20. FIG. 22 is a diagram illustrating the right side of a vehicle portion with upper and lower door hinges 902, 904 for mounting the RH rigid support bracket according to some embodiments of the present invention.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

For example, the specific sequence of the above described process may be altered so that certain processes are conducted in parallel or independent, with other processes, to the extent that the processes are not dependent upon each other. Thus, the specific order of steps described herein are not to be considered implying a specific sequence of steps to perform the above described process. Other alterations or modifications of the above processes are also contemplated. For example, further insubstantial approximations of the above equations are also considered within the scope of the processes described herein.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A mirror mounting assembly for mounting a mirror to a vehicle having at least one hinged door with a door hinge area, comprising:
   a mirror mounting arm having an arm portion configured to support a mirror; and
   a rigid support member configured to be mounted to a frame of the vehicle at a first vehicle location and a second vehicle location, the first vehicle location and the second vehicle location form a line that is substantially vertical to the ground, wherein the rigid support member is configured to be connected to the mirror mounting arm at a mount location, and wherein the rigid support member is fastened into the door hinge area of the vehicle when the hinged door is removed.

2. The mirror mounting assembly of claim 1, further comprising a lateral support member having a lateral base end portion configured to be connected to the vehicle and a lateral distal end portion configured to be connected to the rigid support member.

3. The mirror mounting assembly of claim 1, wherein the rigid support member comprises a lower support member having a lower distal end portion and an upper support member having an upper distal end portion, and wherein the lower distal end portion of the lower support member and the upper distal end portion of the upper support member are connected to the upper support member.

4. The mirror mounting assembly of claim 1, wherein the rigid support member comprises a lower support member and an upper support member, and wherein the upper support member is connected substantially perpendicular to at least a portion of the lower or upper support member.

5. The mirror mounting assembly of claim 1, wherein the rigid support member comprises a lower support member and an upper support member, and wherein the upper support member is in the form of a single-piece lateral mounting casting substantially configured in a triangular shape for connection to the frame or structural area of the vehicle.

6. The mirror mounting assembly of claim 1, wherein the mirror mounting assembly is configured to mount a rear view mirror.

7. The mirror mounting assembly of claim 1, wherein the mirror mounting assembly is configured to mount a cross view mirror.

8. The mirror mounting assembly of claim 1, further comprising a second mirror mounting arm having a second arm portion configured to support a second mirror and connected to the rigid support member.

9. The mirror mounting assembly of claim 8, wherein the mirror mounting assembly is configured to mount both a rear view mirror and a cross view mirror.

10. The mirror mounting assembly of claim 9, wherein the rear view mirror is supported by the mirror mounting arm, and wherein the cross view mirror is supported by the second mirror mounting arm.

11. The mirror mounting assembly of claim 1, wherein a lateral support member is positioned between the rigid support member of the mirror mounting assembly and the vehicle to reduce vibration or provide further stability to the mirror mounting assembly when the vehicle is moving.

12. The mirror mounting assembly of claim 1, further comprising a mounting support plate configured to be connected to a lateral support member and supported by a structural location, frame or engine bay of the vehicle.

13. The mirror mounting assembly of claim 12, wherein the support plate has one or more open slots to facilitate installation of the support plate.

14. The mirror mounting assembly of claim 13, wherein the one or more open slots include a first open slot and a second open slot, each open slot is cut from a peripheral of the support plate and further into a middle portion of the support plate, each open slot has an opening, an end portion, and a channel in between the opening and the end portion, the opening, the channel, and the end portion of each open slot are sized to receive a corresponding bolt.

15. The mirror mounting assembly of claim 12, wherein the support plate is a polygon defined by an X-axis and a Y-axis, and wherein the first open slot has a first facing direction aligned with the X-axis and the second open slot has a second facing direction aligned with the Y-axis.

16. The mirror mounting assembly of claim 15, wherein the second facing direction is downward.

17. The mirror mounting assembly of claim 15, further comprises a tab configured to facilitate holding the plate during installation, wherein the tab has a longitudinal direction aligned with the Y-axis.

18. The mirror mounting assembly of claim 1, wherein the rigid support member has an upper member and a lower member, wherein the mirror mounting arm is mounted to the mount location connecting to the upper member.

19. The mirror mounting assembly of claim 18, wherein the rigid support member is fastened into the door hinge area of the vehicle through both the upper member and the lower member.

20. The mirror mounting assembly of claim 18, wherein the upper member is an U-shaped structure having a longitudinal direction, the opening of the U-shaped structure is facing the opposing direction of the door hinge area of the vehicle, and wherein the longitudinal direction of the U-shaped structure is substantially perpendicular to the line formed by the first vehicle location and the second vehicle location.

21. The mirror mounting assembly of claim 18, wherein a portion of the lower member is an U-shaped structure having a longitudinal direction, the opening of the U-shaped structure is facing the door hinge area of the vehicle, and wherein the longitudinal direction of the U-shaped structure is substantially aligned with the line formed by the first vehicle location and the second vehicle location.

* * * * *